United States Patent [19]

Bancroft et al.

[11] Patent Number: 4,878,586

[45] Date of Patent: Nov. 7, 1989

[54] RACK AND TUBE MEMBER FOR ORGANIZING ELECTRICAL CORDS

[76] Inventors: Darl Bancroft; Beverly Bancroft, both of 10490 Clark Rd., Eagle, Mich. 48822

[21] Appl. No.: 266,431

[22] Filed: Nov. 2, 1988

[51] Int. Cl.[4] .................................................. A47F 5/08
[52] U.S. Cl. ...................................... 211/106; 211/87; 211/59.1; 206/328
[58] Field of Search ............... 211/106, 87, 59.1, 60.1; 206/328; 248/90

[56] References Cited

U.S. PATENT DOCUMENTS

| | | | |
|---|---|---|---|
| 301,204 | 7/1884 | Berry | 211/106 X |
| 2,066,822 | 1/1937 | Cohen | 211/87 X |
| 2,222,831 | 11/1940 | Bitney | 211/106 X |
| 2,634,865 | 4/1953 | Geheb | 211/87 X |
| 4,372,450 | 2/1983 | Licari et al. | 211/87 |

Primary Examiner—Robert W. Gibson, Jr.
Attorney, Agent, or Firm—Ronald E. Smith; Joseph C. Mason, Jr.

[57] ABSTRACT

A wall-mounted rack for flexible electrical cords. The rack includes a pair of parallel, laterally spaced, vertically aligned, post members interconnected by at least one horizontally disposed interconnecting member having a medial portion adapted to facilitate attachment of the rack to a wall. Electrical cords are accordion-folded and slidably inserted into a tubular member that is labeled to identify the specific cord stored therein. Peg members mounted on the posts support opposite ends of the folded cords so that the labeled tubular members are attractively suspended between the post members.

6 Claims, 3 Drawing Sheets

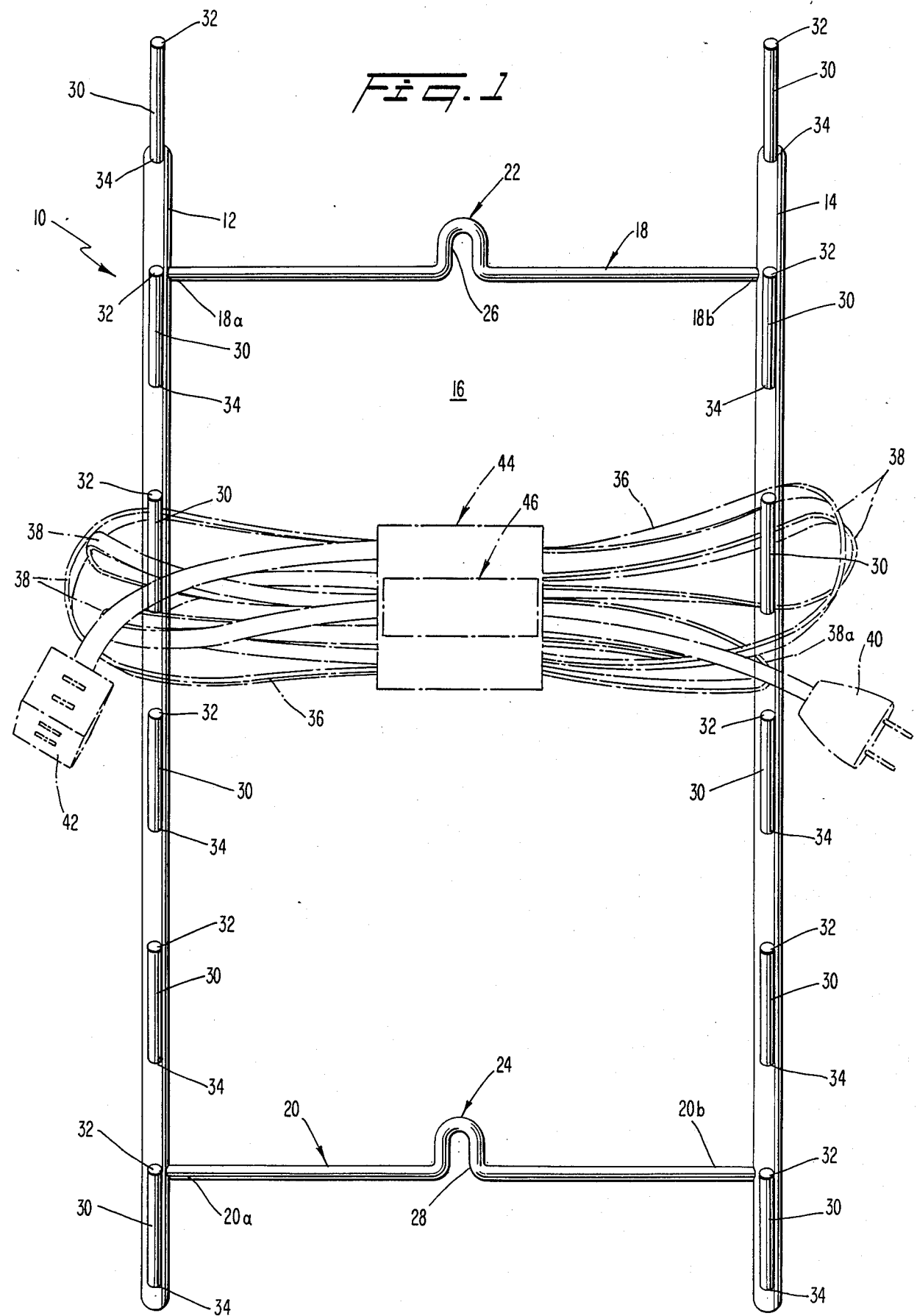

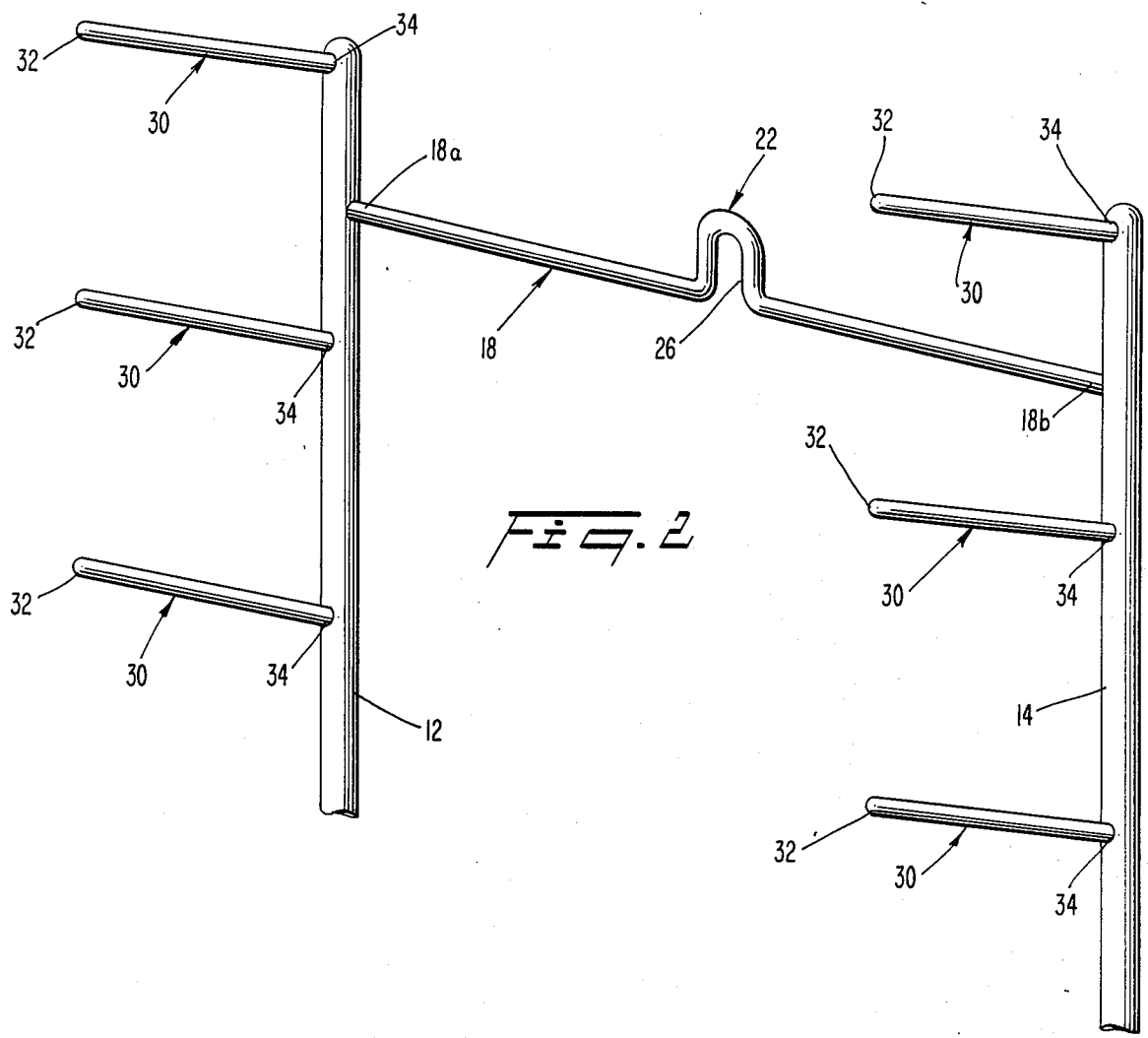
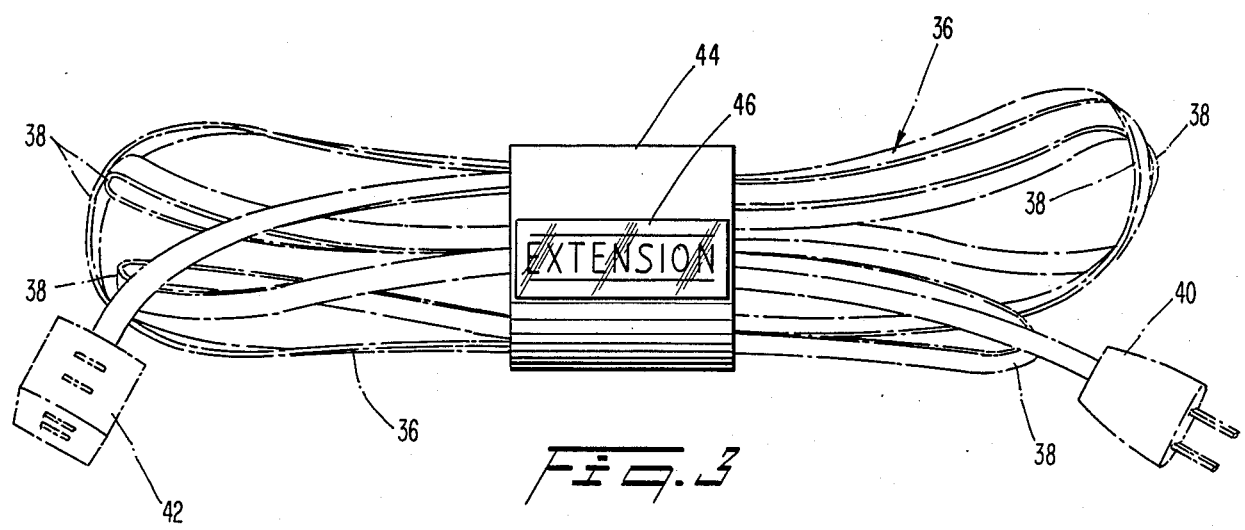

U.S. Patent  Nov. 7, 1989  Sheet 3 of 3  4,878,586
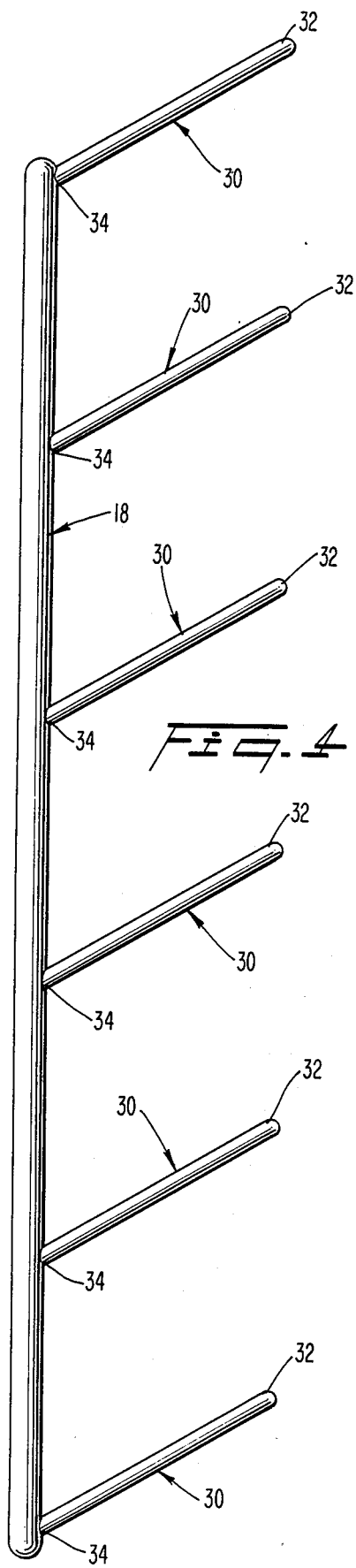
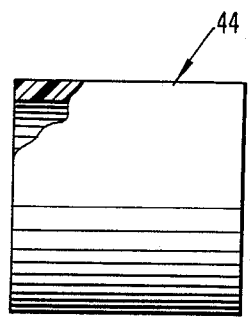
Fig. 5
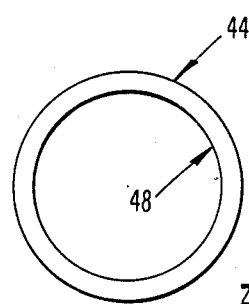
Fig. 6
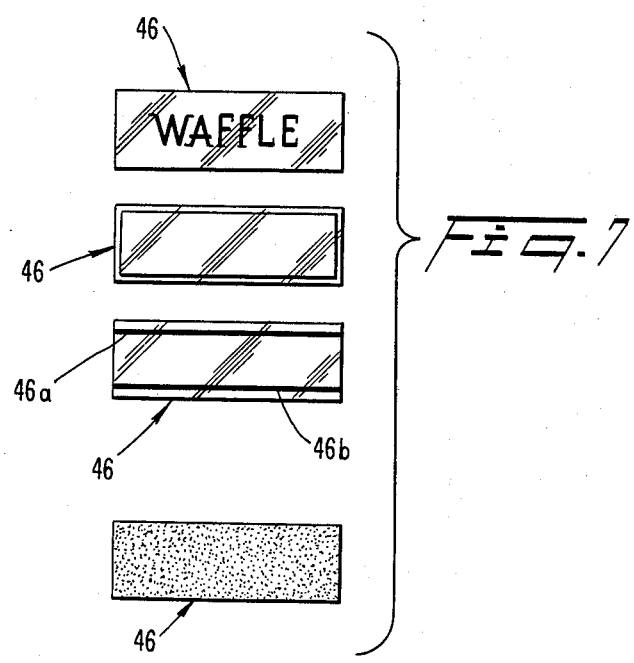
Fig. 7

RACK AND TUBE MEMBER FOR ORGANIZING ELECTRICAL CORDS

TECHNICAL FIELD

This invention is in the field of devices that have utility in organizing items that are commonly maintained in a disorderly state. More specifically, it relates to an organizer rack especially designed to maintain a plurality of electrical cords in a high degree of order.

BACKGROUND ART

Many household appliances are small devices intended to be used on counter tops. Examples of such small appliances are toasters, coffee makers, food processors, can openers, and the like.

Such appliances are usually electrically powered and as such are provided with electrical cords; in some cases, the devices are provided with removably mounted electrical cords and in other cases, the electrical cord may be permanently secured to the appliance.

Safety experts recommend that such devices be unplugged when not in use, because power surges of the type usually caused by lightning may damage the appliance or even start a fire if the devices are left plugged in all the time.

Some larger electrical devices, such as television sets, or electricity-requiring devices such as Christmas trees, are often located such that power is delivered to them through extension cords. Again, it is advisable to store such extension cords when they are not in use.

Most people, unfortunately, do not unplug their electrical devices when they are not in use, nor do they have any storage system for electrical cords that are not in use, other than to toss them into a box where they become intertwined and difficult to separate due to their random orientation.

Numerous attempts have been made to provide electrical cord and extension cord organizers. The devices have been invented for the admirable purpose of encouraging safety among electrical appliance users. Organizer rack-type devices are shown in the following U.S. patents:

| | | |
|---|---|---|
| 17,911 | 1,515,539 | 2,400,807 |
| 481,167 | 1,518,216 | 3,664,719 |
| 1,215,476 | 1,789,628 | 3,976,201 |
| 1,262,493 | 1,810,826 | 4,577,809 |
| 1,380,747 | 1,917,603 | |

Clearly, the art of organizers in general is well developed. However, it has not yet reached its ultimate state of development and advances of the type disclosed hereinafter continue to be made.

DISCLOSURE OF INVENTION

The present invention provides tube members into which properly folded electrical cords are slidably inserted. In one embodiment of the invention, the tube members are removably mounted on a wall mounted rack member and have utility in connection with cords that are removable from their respective appliances.

In another embodiment, the rack member is not employed. Unplugged cords of the type permanently attached to appliances are stored in folded configuration within a tube member.

In both embodiments, adhesive labels are affixed to the tubes, one label per tube. Information identifying the appliance with which the stored tube is associated is imprinted upon the label so that a wok cord is not mixed with a waffle iron cord, for example.

In the preferred embodiment of the invention, a plurality of tubes and their associated cords are arrayed in vertically and equidistantly spaced relation to one another with each tube lying in a horizontal plane and all tube lying in a common vertical plane.

Said convenient and novel orientation of the tubes is made possible by a rack member that includes a pair of laterally spaced, wall mounted post members; peg members project forwardly from the post members and are equidistantly spaced along the extent thereof. Looped opposite ends of each cord member are removably supported by the pins so that the tube members, which are positioned between the post members, are suspended between said post members.

The identifying indicia of each tube member faces forwardly so that the cords held in the individual tubes are readily identifiable.

It is the primary object of this invention to advance the art of electrical cord storage racks by providing an organizing rack of elegant construction, low cost and attractive appearance.

The invention accordingly comprises the features of construction, combination of elements and arrangement of parts that will be exemplified in the description set forth hereinafter and the scope of the invention will be set forth in the claims.

BRIEF DESCRIPTION OF DRAWINGS

For a fuller understanding of the nature and objects of the invention, reference should be made to the following detailed description, taken in connection with the accompanying drawings, in which:

FIG. 1 is a front elevational view of an illustrative embodiment of the invention;

FIG. 2 is a perspective view of the upper half of the embodiment shown in FIG. 1;

FIG. 3 is a front elevational view of a single tubular member of this invention and a cord means slidably inserted therein;

FIG. 4 is a side elevational view of the embodiment of FIG. 1;

FIG. 5 is a front elevational, partially broken away view of a singular tubular member of this invention;

FIG. 6 is an end view of the tubular member of FIG. 5; and

FIG. 7 is a composite, front elevational view of sundry label means having utility in connection with this invention.

Similar reference numerals refer to similar parts throughout the several views of the drawings.

BEST MODES FOR CARRYING OUT THE INVENTION

Referring now to FIG. 1, it will there be seen that a preferred embodiment of the invention is denoted by the reference numeral 10 as a whole.

A pair of laterally spaced, vertically aligned post members 12, 14 are disposed in parallelism to one another and are mounted to a wall 16, such as a kitchen or garage wall.

Although each post member 12, 14 could be adhered to wall 16 in its functional position by applying a suitable adhesive, or by other means, the preferred means for securing the post members to the wall includes a pair of upper and lower interconnecting members, denoted 18, 20, respectively. Interconnecting members 18, 20 are horizontally disposed and their respective opposite ends 18a, 18b, 20a, 20b are fixedly secured to the post members by any suitable means.

The respective medial portions of the upper and lower interconnecting members are denoted 22, 24, respectively. The inverted U-shape thereof defines an arch-shaped cavity 26, 28 into the center of which a standard screw, nail, or other suitable fastening means (not shown) is inserted to supported the weight of the entire apparatus 10. A rectilinear or other predetermined geometric configuration in obviation of the illustrated embodiment of the medial portion is also within the scope of this invention as those skilled in the mechanical arts will appreciate.

In this manner, rack 10 may be positioned on a wall at any location and may be moved to new locations as desired in accordance with the consumer's whims. A single interconnecting member 18 or 20, having its opposite ends affixed to any point along the extent of post members 12, 14, would suffice to hold rack 10 in its functional position.

A plurality of peg members, collectively designated 30, are equidistantly spaced along the extent of each post member 12, 14 as shown in FIG. 1. Each peg member 30 has a longitudinal axis of symmetry lying in a plane orthogonal to that of wall 16. Moreover, as suggested in FIG. 1, each peg 30 has a distal free end 32 positioned at a higher elevation than its proximal end 34 for reasons that will become more clear as this description proceeds.

Each peg 30 is inclined at an angle to the horizontal common to all the other pegs 30, although rack 10 would perform its intended function even if each peg 30 were inclined at a unique angle relative to the horizontal, as will become more clear hereinafter.

The preferred common angular relation of each peg 30 to the horizontal is depicted in FIG. 2, wherein the angle relative to the horizontal is small, and in FIG. 4 where the angle is greater such as in FIG. 1.

FIG. 3 shows a folded electrical cord 36 in environmental lines because cord 36 forms no part of the invention, per se. A plurality of return bends, collectively denoted 38, are formed at substantially equal preselected intervals along the extent of cord 36 to fold said cord in the well-known way, which fold is sometimes called an accordion fold. Cord 36 includes a plug 40 and a socket 42 at its opposite ends.

Once folded by the consumer, cord 36 is slidably inserted into a novel tube member 44 as depicted in FIG. 3. Tube 44 has a pre-printed label 46 affixed thereto as shown to identify the cord.

Tube 44 is shown in its unlabeled condition in FIG. 5, with a portion thereof broken away to show its construction; its tubular structure is perhaps better understood in connection with FIG. 6. The cylindrical inner wall 48 of each tube 44 is smooth as shown to avoid abrasion of a cord 36 as it is inserted and withdrawn repeatedly as the inventive structure is used.

Plural labels 46 are depicted in FIG. 7; they may be pre-printed or left blank so that the consumer may write or type in the name of an appliance thereon, both of which label choices are shown. Also shown is a base member having inwardly folded, longitudinally extending edges 46a, 46b; blank or pre-printed labels may be slidably inserted thereinto to enhance the flexibility of the inventive device as old appliances are discarded and new ones purchased.

Those skilled in the art of materials will appreciate the fact that the present invention could be made of many different materials, such as steel, plastic, vinyl or plastic coated round steel, etc. Moreover, the tubes could be formed of high impact plastic or other suitable materials. For aesthetic effect, numerous attractive colors could be applied to various parts of the invention, as desired.

INDUSTRIAL APPLICABILITY

The novel appliance cord organizer has industrial as well as residential applications. In industrial applications, it should help industry in complying with general OSHA regulations concerning neatness and organization in the workplace.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. An organizer rack for electrical cords, comprising:
   a first elongate post member;
   said first post member being mounted to a wall means;
   a first plurality of peg members disposed in equidistantly spaced relation to one another along the extent of said first post member;
   said first plurality of peg members lying in a common vertical plane orthogonal to a plane of said wall means;
   said first plurality of peg members being disposed upwardly at a common predetermined angle relative to a horizontal plane;
   a second elongate post member mounted to said wall means in laterally spaced, parallel relation to said first post member;
   a second plurality of peg members disposed in equidistantly spaced relation to one another along the extent of said second post member;
   said second plurality of peg members lying in a common vertical plane orthogonal to a plane of said wall means;
   said second plurality of peg members being disposed upwardly at a common predetermined angle relative to a horizontal plane;
   said first and second post members being vertically disposed;
   means for securing said first and second post members to said wall means;
   a plurality of truncate tubular members; and
   said plurality of tubular members being equal to one-half the number of said peg members;
   whereby a plurality of electrical cord means that have been folded at equidistant intervals along their respective extents are slidably inserted into a hollow interior of an associated tubular member; and whereby opposite ends of electrical cords that have been folded at substantially equidistant intervals along their extent are releasably engageable to said peg members.

2. The rack of claim 1, wherein a medial portion of each cord means is disposed within an associated tubular member so that substantially equal lengths of said folded cord means are external to their associated tubular members.

3. The rack of claim 2, further comprising indicia means disposed on each of said tubular members.

4. The rack of claim 1, wherein said means for securing said post members to said wall means comprises a horizontally disposed, linear in configuration interconnecting means having opposite ends fixedly secured to said first and second post members.

5. The rack of claim 4, wherein said interconnecting means has a central portion adapted to facilitate attachment of said interconnecting means to said wall means.

6. An organizer rack, comprising:
a plurality of tube members;
a pair of laterally spaced post members disposed in parallelism to one another;
said post members being secured to a wall means in vertical disposition;
a different elongate flexible cord means, folded at substantially equidistant intervals along its extent, disposed in preselected tube members so that opposite portions of said cord means are disposed externally of said tube members;
said opposite portions of said cord means being formed in a looped fashion by reason of said folding;
a plurality of equidistantly and vertically spaced peg members secured to both of said post members, each of said peg members on a first post member being disposed in horizontal alignment with a corresponding peg member on a second post member;
each of said peg members projecting outwardly relative to said wall means;
each of said peg members inclined upwardly relative to a horizontal plane;
oppositely disposed looped ends of each cord means being removably secured to oppositely disposed, corresponding peg members; and
each of said tube members having a longitudinal axis of symmetry disposed in a horizontal plane when said oppositely disposed looped ends of each cord means is secured to an associated peg member.

* * * * *